May 5, 1970  V. A. ERICKSON ET AL  3,509,837
PLANTER LOCKOUT DEVICE

Filed Aug. 11, 1967  2 Sheets-Sheet 1

INVENTORS
VEDICK A. ERICKSON
A. LOWELL NORRIS

*A. L. McNiel*
ATTY

May 5, 1970  V. A. ERICKSON ET AL  3,509,837
PLANTER LOCKOUT DEVICE
Filed Aug. 11, 1967  2 Sheets-Sheet 2
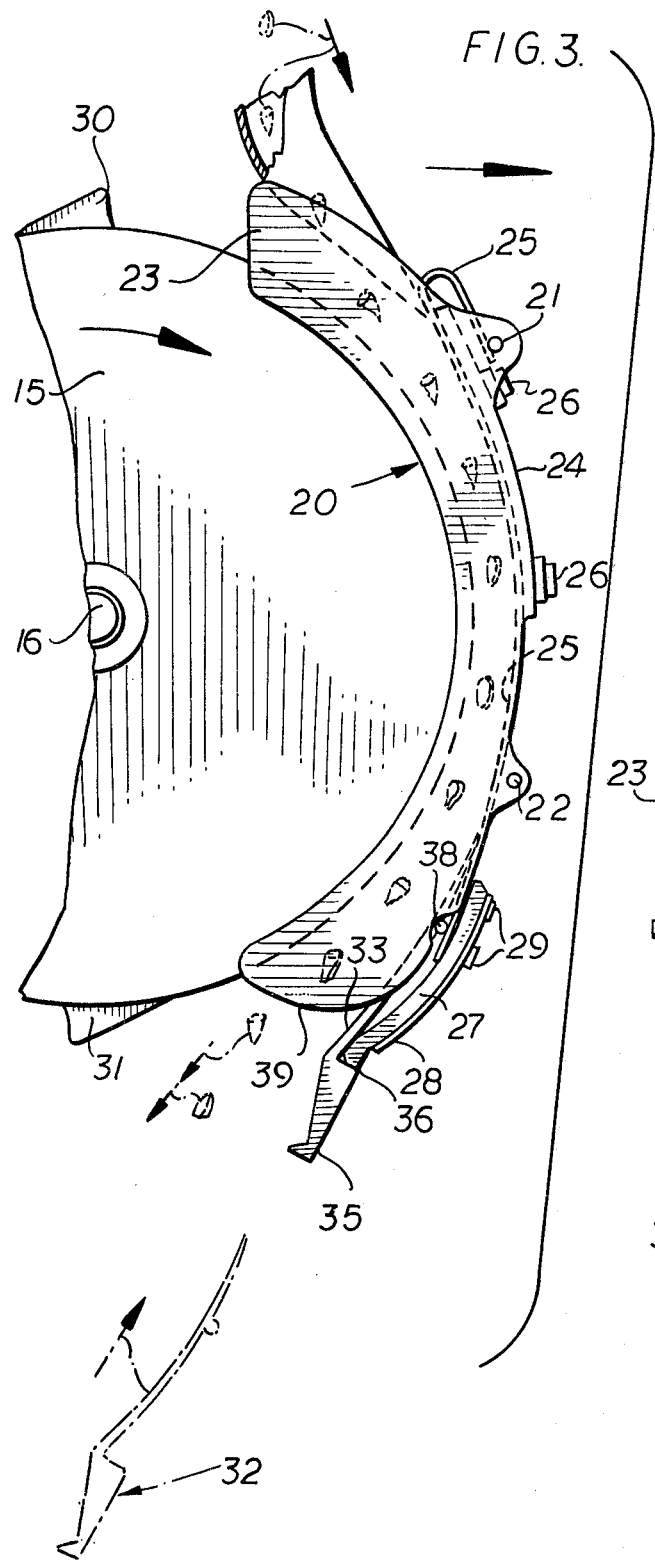
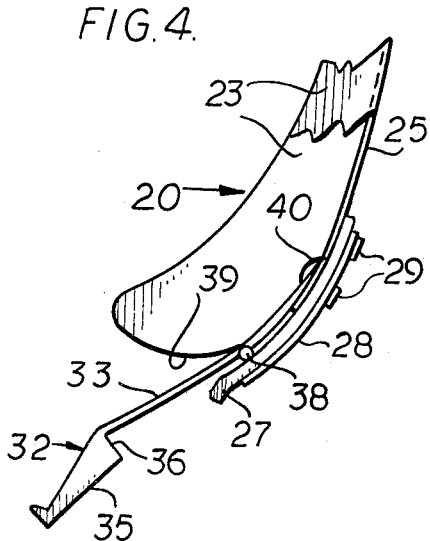
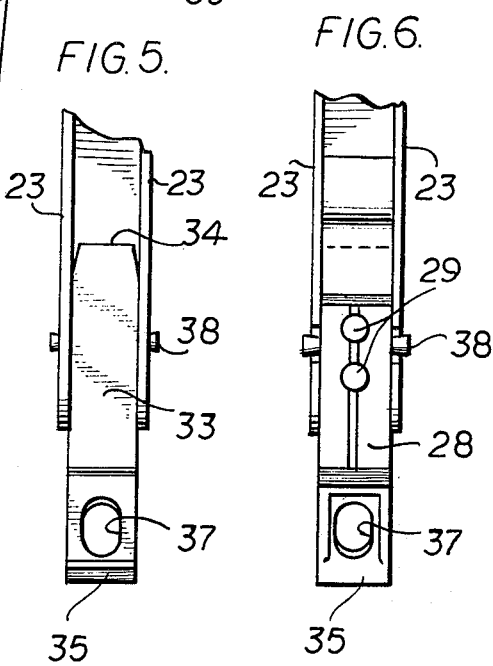
INVENTORS
VEDICK A. ERICKSON
A. LOWELL NORRIS
*J. K. McNeill*
ATTY United States Patent Office 3,509,837
Patented May 5, 1970

3,509,837
PLANTER LOCKOUT DEVICE
Vedick A. Erickson, Naperville, and A. Lowell Norris, Downers Grove, Ill., assignors to International Harvester Company, Chicago, Ill., a corporation of Delaware
Filed Aug. 11, 1967, Ser. No. 659,914
Int. Cl. A01c 7/18
U.S. Cl. 111—77
2 Claims

ABSTRACT OF THE DISCLOSURE

A lugged seed wheel is rotatably mounted in a hill drop planter boot between the hopper and the ground and is engaged by one end of a yieldable valve mounted in the boot to accumulate seed between the periphery of the wheel and the valve, the accumulated seed being ejected by engagement and deflection of the valve by one of the wheel lugs. To convert the planter to drilling the valve is disabled by a lockout member insertable through the bottom seed discharge outlet and engageable with the valve to hold it away from the wheel and allow the seed to fall freely.

---

This invention relates to planters of the type adapted to deposit several seeds in spaced hills, and particularly to means for converting such a planter for drilling.

The present invention is particularly applicable to a planter of the type wherein a vertically rotatable seed wheel is mounted in a planter boot and a flexible or spring biased valve is mounted in the boot and forms with the periphery of the wheel a pocket to accumulate seed discharged from the hopper. Lugs on the wheel periodically engage and deflect the valve and eject the accumulated seed. When it is desired to use the planter for drilling it is customary to disable the hill drop mechanism by dismantling one or more parts of the boot structure and removing the wheel and/or the valve.

An object of this invention is the provision of novel means for quickly and efficiently converting a hill drop planter to a drill planter.

Another object of the invention is the provision of a lockout device for a planter hill drop valve wherein a yieldable seed accumulating valve is mounted in the planter boot in association with a feed wheel having lugs adapted to periodically deflect the valve to eject the seed, the lockout device being adapted to be inserted into the boot in operative engagement with the valve to hold the valve away from the wheel and allow the seed to fall without interruption.

Another object of the invention is the provision in a hill drop planter including a lugged ejector wheel and a yieldable seed accumulating valve deflectable by the wheel lugs to eject the seed wherein a concentric channel-shaped member forms with the periphery of the wheel a seed guide tub in which the valve is mounted, of a lockout member adapted to be wedged between the valve and a cam surface on the channel-shaped member to deflect the valve against its bias away from its operative relation to the ejector wheel and provide for the free passage of seed through the guide channel.

Other objects and advantages of the invention will become clear from the following detailed description when read in conjunction with the accompanying drawings wherein:

FIG. 3 is an enlarged detail of a portion of FIG. 1 showing the valve lockout device in operation and the planter mechanism converted for drilling.

FIG. 4 is a detail showing the planter valve means and the lockout member partly inserted.

FIG. 5 is a front elevation of a portion of the structure shown in FIG. 3; and

FIG. 6 is a rear elevation of the structure shown in FIG. 5.

Figure 1:
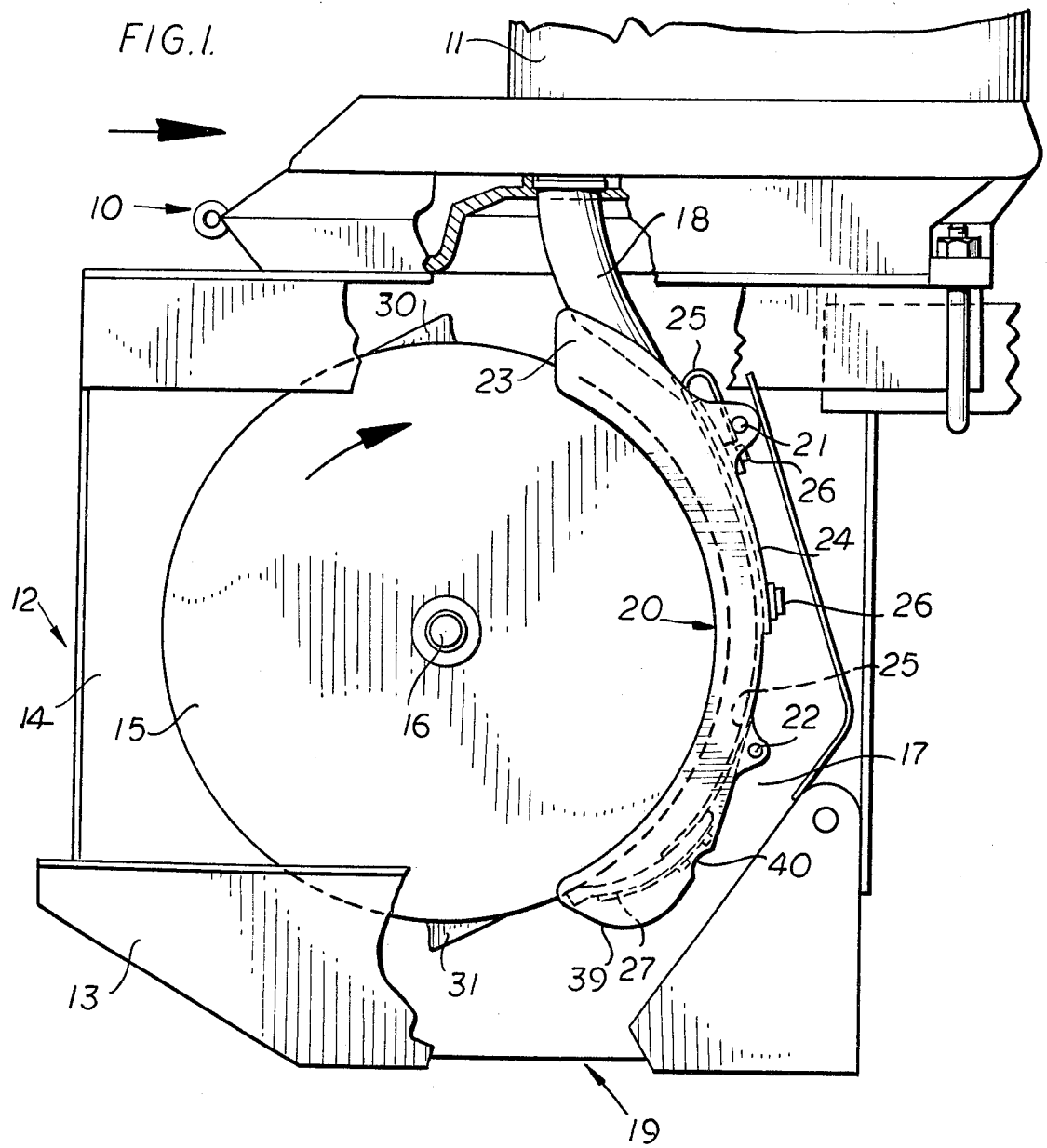
FIG. 1 is a sectional detail in side elevation, with parts removed and broken away, showing the planter of this invention arranged for hill dropping seed.
Figure 2:
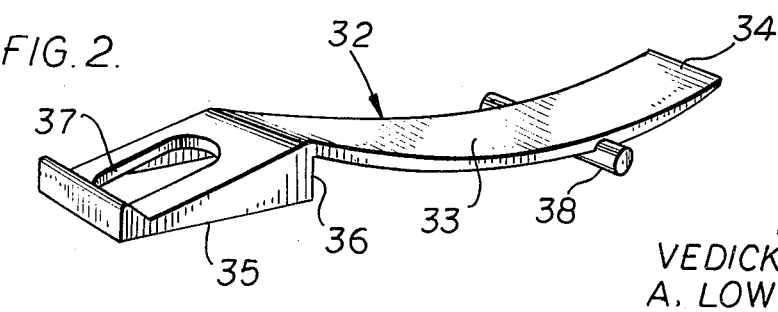
FIG. 2 is a perspective view of the valve lockout device of this invention.

In the drawings the numeral 10 designates the frame of a planter unit having mounted thereon a seed hopper 11 and having secured thereto a planter boot structure 12 on the lower end of which is mounted a furrow opener 13. The planter boot 12 includes side plates 14, only one of which is shown, between which is mounted a seed wheel 15 rotatably secured to a drive shaft 16, preferably driven from conventional seed metering mechanism, not shown, at the base of hopper 11.

The side plates 14 of planter boot 12 closely confine the rotor or seed wheel 15 and form the lateral limits of an area designated 17 between the outlet of tube 18 and the opening indicated at 19 in the bottom of the furrow opener 13 through which seed passes into the furrow formed thereby.

A channel-shaped seed guide member 20 is stationarily mounted between plates 14 by pins 21 and 22 concentric with a portion of the periphery of wheel 15 and communicating at its upper end with tube 18. Member 20 is generally U-shaped in cross-section and comprises sides 23 spaced sufficiently to receive therein a portion of the outer periphery of wheel 15, and a bridge 24 forming a part of the base of the seed guide, the balance of the guide base being formed by an elongated flexible spring steel member 25, the upper portion of which is secured to bridge 24 by bolts or rivets 26, and the upper end of which is bent back upon itself over the upper end of bridge 24 and under pin 21.

As shown in FIG. 1, the lower portion of spring steel member 25 curves inwardly toward rotor 15 and is freely flexible within the confines of and relative to the lower walls 23 of guide member 20.

A curved extension 27, preferably of hard rubber or plastic, having a relatively rigid backing plate 28 of plastic or the like is secured to the lower end of spring member 25 by bolts or rivets 29.

In the operating position of the parts for hill dropping seed, as shown in FIG. 1, the lower end of spring 25 with extension 27 functions as a seed valve and accumulates pockets of seed discharged from tube 18 by engagement of the valve with the periphery of wheel 15 between radially projecting lugs 30 and 31 secured to the periphery of the wheel. During rotation of the wheel in the direction of the arrow shown in FIG. 1, the lower valve end of member 25 which has accumulated seed therebetween and the periphery of the wheel, is engaged successively by lugs 30 and 31 and deflected, ejecting the accumulated seed through the discharge opening 19 into the furrow in the ground.

Guide 20 forms with the periphery of the wheel a guide tube for seed discharged from tube 18, and in order that the planter may be utilized to drill seed as it is metered from the hopper 11, lockout means for the valve is provided in the form of a wedge-like member generally designated by the numeral 32 having a curved main body 33 preferably sharpened at end 34 and having a thickened handle portion 35 at its other end, forming a shoulder 36 therebetween and the main body 33. An elongated slot 37 is provided in the handle portion 35 to facilitate manipulation of the lockout member 32. A transversely extending pin 38 is formed on the convex face of the main body 33 and projects laterally from opposite sides thereof.

To convert the planter to drilling, the operator grasps handle 35 of lockout member 32 and inserts the body 33 into the planter boot through opening 19 in the bottom of the furrow opener 13, wedging the end 34 between the lower end of spring valve 25 and the periphery of the wheel 15. The lower end of guide 20 becomes a stationary reaction member, the main body 33 sliding snugly between the side walls 23 of the guide, and pin 38 engages and rides upon a curved camming surface 39 formed on the forward lower edges of side walls 23, forcing the lower end of the valve forwardly against its bias as indicated by the intermediate position of FIG. 4. Insertion of the lockout member is continued until pin 38 is received in slots 40, the lower edge of extension 27 engages shoulder 36, and the valve is effectively blocked out of the path of the seed.

As indicated in FIG. 3, seed now falls without interruption as it is metered from the hopper 11 through guide 20 and opening 19 into the furrow. Reconversion of the planter to hill dropping now requires only that the operator grasp handle 35 and withdraw the lockout member.

It is believed that the construction and operation of the novel lockout device for a planter valve will be clearly understood from the foregoing description. It should likewise be understood that the invention has been described in its preferred embodiment and that modifications may be made therein without departing from the spirit of the invention.

What is claimed is:

1. In a seed planter including a seed hopper, a furrow opener, a seed channel between the hopper and the furrow opener through which seed is discharged from said hopper, a rotary member in the seed channel having peripherally projecting seed ejector means thereon, a relatively stationary seed guide member having side walls and mounted in said channel, said side walls having rear edges disposed away from said rotating member, a yieldable valve member mounted between and deflectable relative to said side walls and having its lower end biased toward the periphery of said rotary member to accumulate seed between the valve member and the periphery of said rotary member, said valve member being periodically deflectable by said seed ejector during rotation of the rotary member, the combination of a lockout member for said valve member inserted between the rear edge of said relatively stationary seed guide member and said biased valve member and in engagement with both, said lockout member being operable against the bias of said valve member to hold the valve member away from said rotary member and accommodate free passage of seed through said seed channel.

2. The invention set forth in claim 1, wherein slots are provided in the rear edges of the side walls of said seed guide and said lockout member has a part receivable in said slots and removably held therein by the bias of said valve member.

References Cited

UNITED STATES PATENTS

| 1,216,788 | 2/1917 | Englund | 111—51 |
| 3,142,275 | 7/1964 | Buhr | 111—51 |
| 3,335,680 | 8/1967 | Bauman et al. | 111—51 |

FOREIGN PATENTS

| 42,934 | 7/1910 | Austria. |
| 828,034 | 2/1960 | Great Britain. |

ROBERT E. PULFREY, Primary Examiner

A. E. KOPECKI, Assistant Examiner

U.S. Cl. X.R.

222—313